US005798081A

United States Patent [19]
Ruijgrok

[11] Patent Number: 5,798,081
[45] Date of Patent: Aug. 25, 1998

[54] METHOD FOR SINTERING GREEN CERAMIC MOULDINGS

[75] Inventor: Rudolphus P. T. Ruijgrok, Roermond, Netherlands

[73] Assignee: U.S. Philips Corporation, New York, N.Y.

[21] Appl. No.: 642,687

[22] Filed: May 3, 1996

[30] Foreign Application Priority Data

May 19, 1995 [EP] European Pat. Off. ............ 95201319

[51] Int. Cl.⁶ .................... C04B 33/32; C04B 37/00
[52] U.S. Cl. .................... 264/605; 264/615; 156/89
[58] Field of Search ................... 264/57, 615, 605, 264/609, 606; 156/89

[56] References Cited

U.S. PATENT DOCUMENTS

| | | | |
|---|---|---|---|
| 2,682,696 | 7/1954 | Milliken | 264/57 |
| 4,474,894 | 10/1984 | Hardtl | 501/136 |
| 4,721,460 | 1/1988 | Bushman et al. | 432/241 |
| 4,778,383 | 10/1988 | Strobel et al. | 432/241 |
| 4,832,887 | 5/1989 | Zeibig | 264/57 |
| 4,919,867 | 4/1990 | Konigs et al. | 264/57 |

FOREIGN PATENT DOCUMENTS

| 976516 | 11/1964 | United Kingdom . |
|---|---|---|
| 1453619 | 10/1976 | United Kingdom . |

*Primary Examiner*—Christopher A. Fiorilla

[57] ABSTRACT

A method of sintering green-ceramic moldings in a heating vessel of a furnace wherein during sintering, the moldings are set in motion in the heating vessel by moving the heating vessel in the furnace. Preferably, the vessel is rotated and pre-firing takes place in the same vessel, resulting in a very efficient method of sintering, in particular, ceramic multi-layer capacitors. In accordance with the sintering method, the process time is relatively short and the volume capacity is very high. A furnace is also provided which is suitable for use in the method in accordance with the invention.

7 Claims, 2 Drawing Sheets

METHOD FOR SINTERING GREEN CERAMIC MOULDINGS

BACKGROUND OF THE INVENTION

1. Field of the Invention

The invention relates to a method of sintering green-ceramic mouldings in the heating vessel of a furnace, said mouldings being set in motion in the heating vessel during sintering. The invention also relates to a furnace comprising a housing which accommodates a heating vessel as well as means for heating said heating vessel and means for supplying gas to said heating vessel.

2. Discussion of the Related Art

Such a method and furnace are disclosed in the British Patent document GB 976,516, in the name of the current applicant. In said Patent document, a method is described in which green-ceramic mouldings are sintered in a so-called "fluid-bed" furnace. In the heating vessel of such a furnace there is a layer of an inert, granular material which is stirred up by means of a gas stream during the sintering operation. As a result of this, the mouldings are set in motion. By means of this known method, a very homogeneous temperature distribution in the heating vessel is obtained, so that the sinter conditions are the same for all mouldings. By virtue thereof, the properties of the individual mouldings after the sintering operation are the same.

The known method has drawbacks. For example, the relatively small volume capacity constitutes an important disadvantage. In practice it has been found that the volume of the products to be sintered is relatively small, compared with the volume of the heating vessel. Another important drawback relates to the gas flow in the heating vessel during sintering. In the known method, the volume of gas administered per unit of time must be relatively large to stir up the granular material. This gas must be heated to the sintering temperature of the mouldings. Consequently, the energy consumption of the known method is relatively high.

SUMMARY OF THE INVENTION

It is an object of the invention to obviate these drawbacks. The invention more particularly aims at providing a method of sintering green-ceramic mouldings, which method enables a high volume capacity to be attained. In addition, the method in accordance with the invention should exhibit a low energy consumption. A further object of the invention is to provide a furnace which can suitably be used in the method in accordance with the invention.

These and other advantages are achieved by a method of the type mentioned in the opening paragraph, which is characterized in that the motion of the mouldings can be attributed to the heating vessel being moved in the furnace during the sintering operation.

The volume capacity of the method in accordance with the invention is much larger than the volume capacity of the known method. In the known method, a large part of the volume of the heating vessel is taken up by the inert, granular material. In the method in accordance with the invention, this material is not used, or only in a limited quantity. By virtue thereof, the method in accordance with the invention enables a much larger volume of green-ceramic mouldings to be sintered in one cycle than the method in accordance with the prior art. Further, it has been found that the quantity of gas to be supplied to the heating vessel during sintering is much smaller than in said known method. The gas supplied is homogeneous in temperature and composition.

Setting the mouldings in motion by moving the heating vessel during sintering is an essential measure of the method in accordance with the invention. If the green-ceramic bodies do not intermingle during the sintering operation, they form agglomerates. This leads to an unacceptably high percentage of rejects.

The heating vessel can be moved in the furnace in various ways. In principle, the vessel can be shaken or set into vibration. An advantageous embodiment of the method in accordance with the invention is characterized, however, in that the heating vessel is rotated in the furnace during sintering. It has been established that the green-ceramic mouldings can be set in motion in an accurately controlled manner if the heating vessel is rotated in the furnace.

Another advantageous embodiment of the method in accordance with the invention is characterized in that the mouldings are also pre-fired in the same heating vessel. Said pre-firing process takes place at a lower temperature than the sinter process. During pre-firing, so-called binder materials escape from the green-ceramic mouldings. Also this process must be carried out in an accurately controlled manner.

The method in accordance with the invention can be used to manufacture all sorts of ceramic mouldings provided that the dimensions of said mouldings are relatively small. For example, this method can in principle be used to manufacture mouldings from soft-magnetic or hard-magnetic ferrite material. Also other types of magnetic mouldings, for example, of metallic materials can be sintered by means of this method. The magnets thus obtained are of good quality. It has been found, however, that the method in accordance with the invention can particularly suitably be used to manufacture ceramic multilayer capacitors.

The invention also relates to a furnace comprising a housing accommodating a heating vessel as well as means for heating the heating vessel and means for supplying gas to the heating vessel. Said furnace is characterized in accordance with the invention in that the heating vessel is movably arranged in the housing. This type of furnace can advantageously be used in the method in accordance with the invention.

An advantageous embodiment of the furnace in accordance with the invention is characterized in that the heating vessel is connected to a shaft which is rotatably arranged in the housing. During operation of the furnace, the vessel rotates about a shaft which projects from the housing and which is driven outside the housing of the furnace. A further, very favourable embodiment of the furnace in accordance with the invention is characterized in that the shaft comprises means for supplying gas to the heating vessel.

These and other aspects of the invention will be apparent from and elucidated with reference to the embodiments described hereinafter.

It is noted that the parts shown in the Figures are not drawn to scale.

DETAILED DESCRIPTION OF THE PREFERRED EMBODIMENTS

Figure 1:
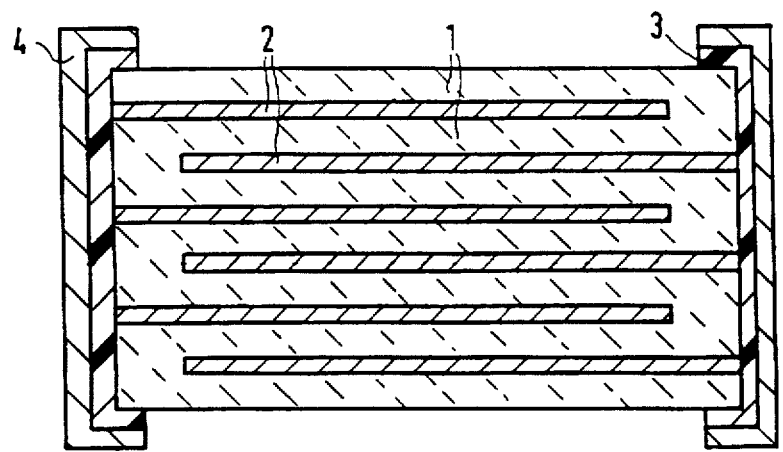
FIG. 1 is a schematic, sectional view of a ceramic multilayer capacitor manufactured in accordance with the method of the invention.

Details of the method in accordance with the invention are described by means of the manufacture of ceramic multilayer capacitors. It has been found that the method of the invention can very advantageously be used to manufacture said ceramic multilayer capacitors. FIG. 1 is a schematic, sectional view of such a ceramic capacitor. This capacitor comprises a number of dielectric layers 1 of a ceramic material, which are separated by metal electrodes 2. Successive electrodes are alternately connected to end contact 3 or end contact 4. In practice, at least several tens to maximally several hundred dielectric layers and electrodes are used in this type of capacitor.

Multilayer capacitors of the type shown are manufactured as follows. A large number of electrode layers are screen printed on green-ceramic foils of a dielectric material by means of, for example, a Pd/Ag-containing paste. A number of the foils thus obtained are stacked to form a multilayer. Said foils are stacked in such a way that the electrode layers of adjacent foils are slightly staggered relative to each other. The plate of multilayer foils thus obtained is compressed, whereafter said plate is divided into a number of rods which are subsequently subdivided into individual capacitor units. The green-ceramic mouldings thus obtained are then pre-fired, post-fired, sintered and post-treated at an elevated temperature. The sintered capacitor bodies are finally provided with end contacts and, if desired, with protective lacquer coatings.

In experiments leading to the invention use was made of two types of capacitors, i.e. capacitors having electrodes of a noble metal (type 1), and capacitors having so-called "base-metal electrodes" (BME; type 2). Of both types of capacitors, green-ceramic capacitor bodies were pre-fired for approximately 7 hours at approximately 900° C. The prefired mouldings of capacitors of type 1 were post-fired for 1 hour at a temperature of approximately 900° C., then sintered in air for 1–2 hours at 1200°–1400° C. and, finally, cooled slowly to room temperature. The pre-fired mouldings of capacitors of type 2 were pre-fired at a temperature above 900° C., then sintered in an atmosphere of nitrogen/water/hydrogen for 1–2 hours at approximately 1300° C., subsequently post-treated in an atmosphere of nitrogen/air for 2–3 hours at approximately 1000° C. and, finally, cooled slowly to room temperature. The capacitor bodies of both types thus obtained were finally provided with end contacts. The finished products (dimensions 1.6 mm×0.8 mm×1.0 mm) were tested for continuity and visually inspected.

In accordance with the invention, the sinter step was carried out in the heating vessel of a furnace, which heating vessel was moved in the furnace during sintering. In the cases in question, the vessel was rotated, the rotary shaft of the vessel being inclined at an angle of approximately 45° to the normal to the surface of the earth. In a number of experiments, the pre-firing and post-firing steps, and optionally the post-treatment at a high temperature, were carried out in the same heating vessel. This embodiment of the method in accordance with the invention has the additional advantage that a number of logistic steps, such as the displacement of the pre-fired mouldings in the course of the process and such, can be dispensed with. It has been found that the vessel should preferably be rotated during the pre-firing step. The pre-fired products, however, are very brittle and hence very fragile. For this reason, the vessel is preferably not moved in the furnace during the post-firing step. It is emphasized that the pre-firing step, post-firing step and, optionally, the post-treatment at a high temperature can alternatively take place in other furnaces.

Figure 2:
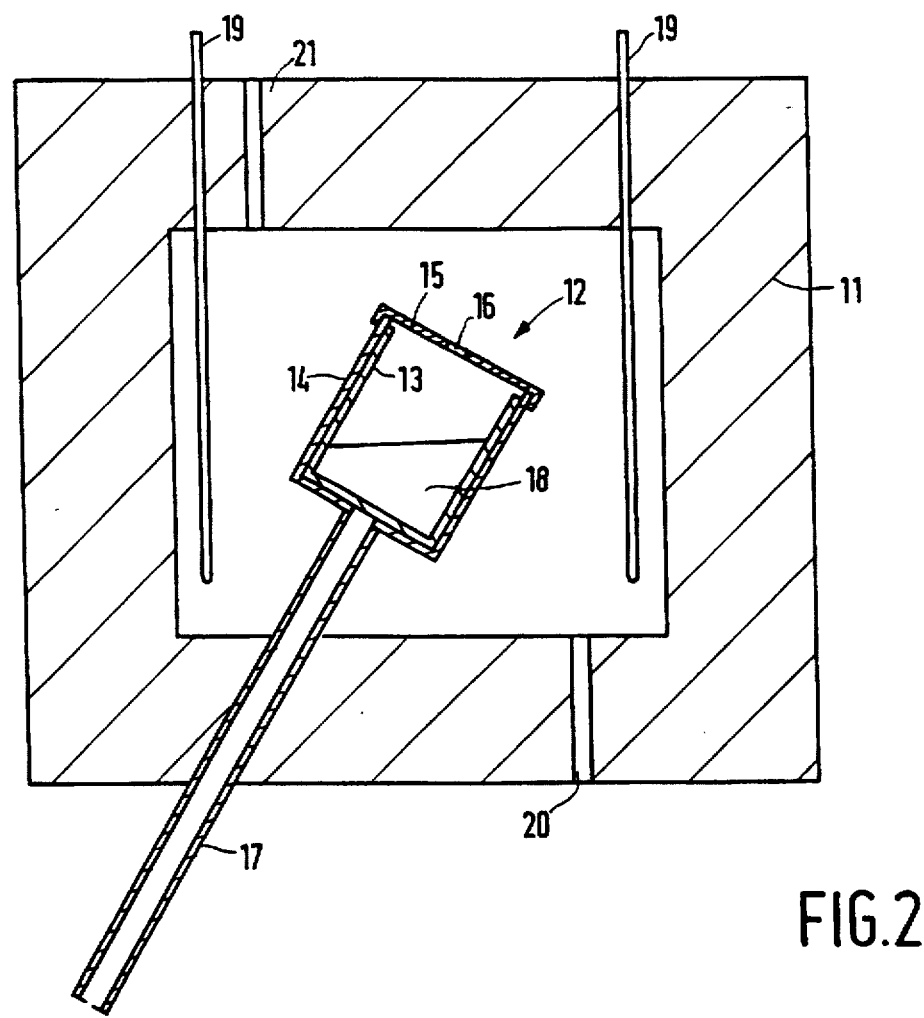
FIG. 2 is a schematic, sectional view of a furnace in accordance with the invention, FIG. 3-A and 3-B are schematic, sectional views of two different heating vessels for use in the furnace in accordance with the invention.

FIG. 2 is a schematic, sectional view of the furnace in accordance with the invention, in which the green-ceramic mouldings were sintered. This furnace comprises a steel housing 11 which is provided on the inside with an insulation layer. Said housing accommodates a heating vessel 12. This vessel comprises an inner vessel 13 of porous zirconium oxide, which is surrounded by an outer vessel 14 of carborundum. The heating vessel is closed by means of a cover 15 having a hole 16.

The outer vessel is attached to a shaft 17 which projects from a wall of the housing and which can be freely rotated about its longitudinal axis by means of a motor (not shown). In this case, use was made of a tubular shaft. By virtue thereof, gas can be led into the heating vessel via this pipe at a pressure which is slightly above atmospheric. The gas diffuses through the porous inner vessel in the central part of the heating vessel. During operation of the furnace in accordance with the invention, the green-ceramic bodies 18 to be sintered, which have been introduced in loose form, are held in said central part of the heating vessel. The slight overpressure causes the gas to escape through the aperture 16 in cover 15. The composition of the gas depends upon a number of factors, such as the composition of the green-ceramic mouldings to be sintered and the necessary sinter temperature.

The furnace also comprises heating means in the form of electrical heating elements 19. In principle, gas heating can alternatively be used. The housing further comprises a supply pipe 20 and discharge pipe 21 for supplying and discharging, respectively, a rinsing gas such as nitrogen.

Figure 3A:
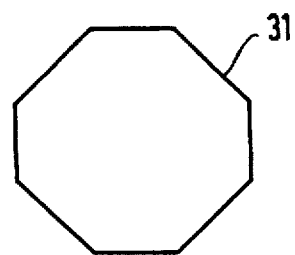
Figure 3B:
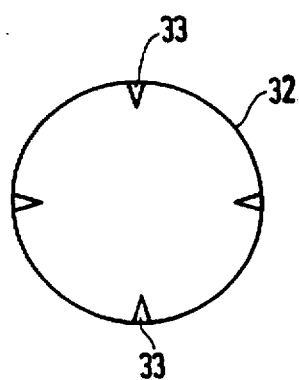

FIGS. 3-A and 3-B are schematic, sectional views used in the inventive method and the inventive furnace shown in FIG. 2. The section is taken at right angles to the longitudinal axis of the vessel. FIG. 3-A shows a vessel 31 having an octagonal circumference. Other polygonal inner vessels, such as hexagonal or decagonal inner vessels can also be used. FIG. 3-B shows a vessel 32 having an essentially round circumference. A number of projections 33 are provided on the inside of the vessel. Said projections extend throughout the length of the vessel. The special shape (FIG. 3-A) and the projections (FIG. 3-B) make sure that the ceramic mouldings are intermixed thoroughly during rotation of the vessel. By virtue thereof, the mouldings are in a homogeneously distributed gas atmosphere as regards temperature and composition.

The ceramic multilayer capacitors sintered in accordance with the method of the invention were subjected to measurements and visual inspection, which showed that they were of good quality. The sintered products did not show fractures. The electrical properties too were satisfactory.

The invention provides a method of sintering green-ceramic mouldings in the heating vessel of a furnace. During sintering, the mouldings in the heating vessel are set in motion by moving the heating vessel in the furnace. Preferably, the vessel is rotated and pre-firing also takes place in the same vessel. Thus, the invention provides a very efficient method of sintering, in particular, ceramic multilayer capacitors. In comparison with state-of-the-art methods, the process time is short and the volume capacity is very high. The invention also provides a furnace which can suitably be used in the method of the invention.

I claim:

1. A method of sintering green-ceramic mouldings in a heating vessel of a furnace, said method comprising the steps of setting the mouldings in motion in the heating vessel during sintering, wherein the motion of the mouldings is attributed to the heating vessel being moved in the furnace during a sintering operation, the motion causing intermingling of the mouldings during sintering.

2. The method as claimed in claim 1, wherein the heating vessel is rotated in the furnace during sintering.

3. The method as claimed in claim 2, wherein the mouldings are pre-fired in the same heating vessel.

4. The method as claimed in claim 2, wherein ceramic multilayer capacitors are used as mouldings.

5. The method as claimed in claim 1, wherein the mouldings are prefired in the same heating vessel.

6. The method as claimed in claim 5, wherein ceramic multilayer capacitors are used as mouldings.

7. The method as claimed in claim 1, wherein ceramic multilayer capacitors are used as mouldings.

* * * * *